April 21, 1942.    F. C. WAPPLER    2,280,561
CAMERA ATTACHMENT FOR SURGICAL INSTRUMENTS
Filed Dec. 21, 1939    2 Sheets-Sheet 1
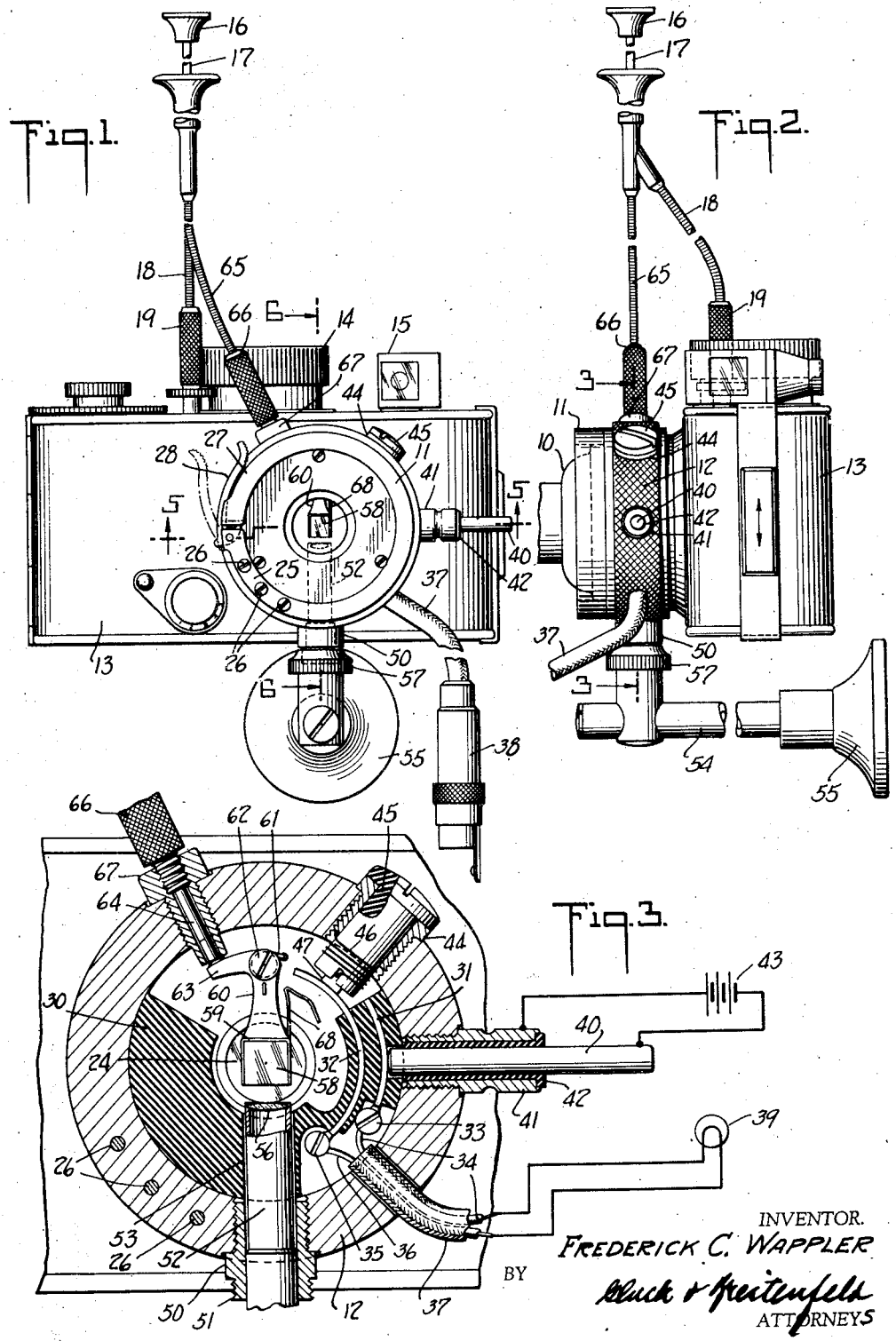
INVENTOR.
FREDERICK C. WAPPLER
BY
ATTORNEYS April 21, 1942.    F. C. WAPPLER    2,280,561
CAMERA ATTACHMENT FOR SURGICAL INSTRUMENTS
Filed Dec. 21, 1939    2 Sheets-Sheet 2

INVENTOR.
FREDERICK C. WAPPLER
BY
ATTORNEYS

Patented Apr. 21, 1942

2,280,561

UNITED STATES PATENT OFFICE 2,280,561

CAMERA ATTACHMENT FOR SURGICAL INSTRUMENTS

Frederick Charles Wappler, New York, N. Y.

Application December 21, 1939, Serial No. 310,370

8 Claims. (Cl. 95—11)

My present invention relates generally to cameras, and has particular reference to a camera attachment for surgical instruments.

The general object of my invention is to provide a camera which is so constructed that it may be instantly attached to any existing endoscopic instrument of the type in which there is a telescope, and an electric lamp for illuminating the field of view of the telescope. Included among such instruments are the numerous and well known types of cystoscopes, bronchoscopes, peritoneoscopes, and the like. Each of such instruments enables the operator to examine—and usually to operate upon—an interior portion of the body under illuminated vision. The purpose of attaching the camera to such an instrument is to enable the operator to obtain a photographic record of the illuminated field of view which the telescope commands.

One of the important characterizing features of the present invention lies in the fact that the camera may be associated with such an endoscopic instrument without requiring any modification whatsoever, of the instrument. In this way, the instruments which are already owned by, or available to, the surgeon are ready for use with the present camera apparatus, and since this apparatus is adapted for instant attachment to, and detachment from, the endoscopic instrument, the latter is available for use at all times, either with or without the camera attachment, at the option of the operator.

Another feature of the present invention lies in the fact that the illuminated field of view remains visible to the operator at all times before and after the taking of a picture, being cut off only momentarily at the instant that the camera shutter functions.

Another important feature of the present invention lies in the provision of an arrangement whereby the conventional electric lamp, which illuminates the field of view of the telescope, is utilized to provide the momentary additional illumination usually required for a photographic exposure.

In brief, these objects are accomplished by providing a camera with means for attaching it so that the camera lens is receptively positioned with respect to the light emanating from the telescope; by providing the camera with a telescope extension permitting continued vision through the telescope even after the camera is attached; and by providing a means operable by the shutter actuator of the camera for increasing the lamp voltage and thereby causing the lamp, at the time of photographic exposure, to give off a more intense illumination.

Another general object of the invention resides in so constructing and arranging the various parts of the apparatus, that in its major respects the camera is of normal and conventional character. As a matter of fact, my invention is so conceived that a conventional camera may be employed for the present purpose, subject only to a slight modification which resides in associating a specially-designed housing with the camera lens. Preferably, this housing is capable of attachment to the camera body in a removable manner, so that the camera may, if desired, be utilized for normal photography.

I achieve the objects and advantages hereinbefore mentioned, and such other general and specific objects as may hereinafter appear or be pointed out, in the manner illustratively shown in the accompanying drawings in which:

Figure 1 is a front view of a camera attachment embodying the features of the present invention;

Figure 2 is a side view, taken from the right of Figure 1, showing the eye-piece of the telescope to which the camera is attached;

Figure 3 is an enlarged fragmentary cross-sectional view taken substantially along the line 3—3 of Figure 2;

Figure 6:
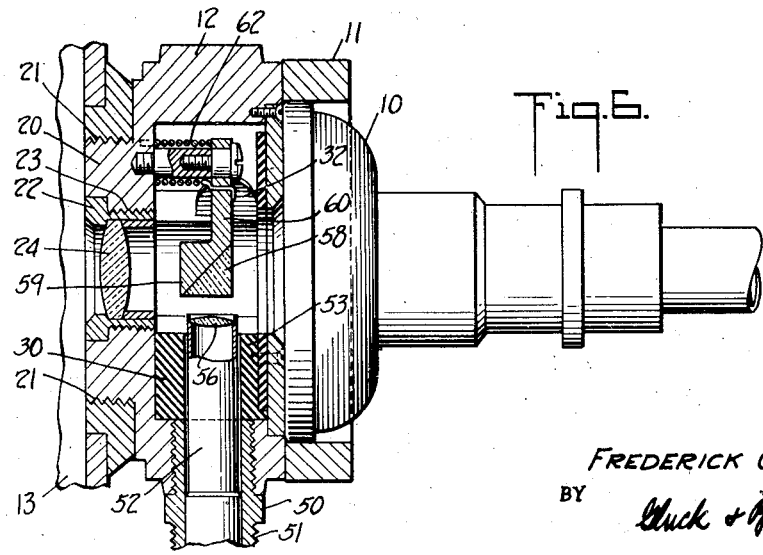
Figure 6 is an enlarged cross-sectional view taken substantially along the line 6—6 of Figure 1, this view also showing the eye-piece of the telescope to which the camera is attached.

Before describing the details of the camera per se, I draw attention to the telescope eye-piece 10 shown in Figures 2 and 6. This is supposed to represent the rear end of a surgical telescope forming part of an endoscopic instrument. It makes no difference, from the standpoint of the present invention, what the nature of such an endoscopic instrument may be, and it is therefore not illustrated. Whatever its general or special capabilities may be, it is of the type in which there is a telescope, and an electric lamp for illuminating the field of view of the telescope. The lamp may be associated with the endoscopic instrument near the objective lens of the telescope (as shown, for example, in U. S. Patent 1,880,551), or it may be structurally associated with the telescope itself (as shown, for example, in U. S. Patent 1,680,491). In either event, there is some sort of electrical connector at the rear end of the endoscopic instrument or of the telescope, by means of which an electrical connection may be established between the electric lamp and a source of electric current. This connector may be of any conventional character (e. g., as designated by the reference numeral 16 in U. S. Patent 1,880,551), and since this is also well known per se, I have omitted the showing of such a connector in the present drawings.

It will be understood, therefore, that the eye-piece 10 is formed on the rear end of a telescope through which the surgeon normally looks to obtain a view of an interior portion of the body, that the field of view of the telescope is illuminated by a suitable electric lamp, and that the instrument or telescope embodies an electrical connector of some sort for supplying electric current to the lamp.

The present camera is intended for attachment to the eye-piece 10 so as to bring the objective lens of the camera into a position which is receptive with respect to the light emanating from the telescope. The exact mode of attachment is a matter of choice, but I prefer to employ a clamping ring 11 mounted on the forward end of a specially-designed housing 12 which is secured to the camera body 13.

Before proceeding with a detailed description of the housing 12, and the parts associated with it, I will point out that the camera body 13 may be of conventional character, and requires no detailed illustration or description. I prefer to employ a camera of the so-called "miniature" type, adapted to use a regular 35 mm. film; and I prefer, further, to employ a camera in which there is a spring motor adapted to advance the film automatically after each exposure. Such a camera is illustrated in Figure 1, 14 being the motor-winding wheel, and 15 the usual finder. Such other portions of the camera as may be shown in the present drawings, but to which no reference numerals have been applied, are also of conventional character.

At 16 I have indicated the knob at the end of the usual "cable release" or shutter actuator. A flexible rod 17 extends through a channel 18 and serves to actuate the shutter when it is moved in one direction, and automatically to advance the film when it moves in the other direction. The channel 18 is removably attachable to the camera body by means of the knurled member 19.

Figure 5:
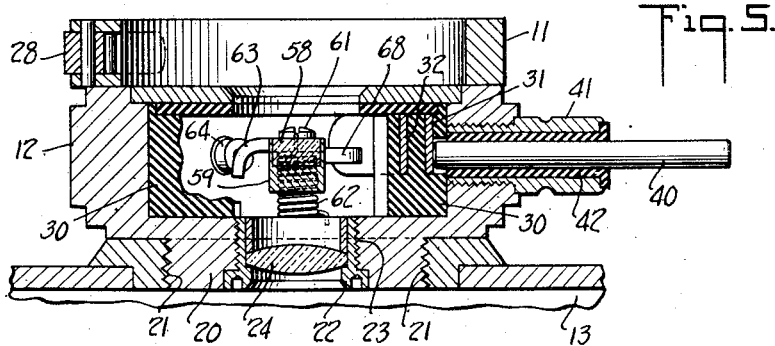
Figure 5 is an enlarged cross-sectional view taken substantially along the line 5—5 of Figure 1.

The metallic housing 12, which embodies the essential elements of the present invention, may be conveniently provided with a rearwardly projecting neck 20 (Figures 5 and 6), externally threaded as at 21, so that the entire housing may be removably secured to the camera body. In the housing shown in the present drawings, the neck 20 carries a sleeve 22, threaded as at 23, within which is the objective lens of the camera. This lens may be of any desired character. Merely for illustrative purposes, I have shown a single convex lens 24, but it will be understood that in practice the objective lens of the camera will preferably be of a corrected composite type.

In the illustrated embodiment, the camera lens is thus a part of the housing 12, so that if this housing is removed, and it is desired to utilize the camera in normal fashion, a separate lens housing will have to be attached to the camera body. It will be understood, however, that it is within the purview of my invention to construct the housing 12 so that it need no necessarily carry the camera objection.

The clamp 11 has been shown in the form of an interrupted broken metallic ring, by which I mean that it has one end 25 rigidly secured to the housing 12 by screws 26, while the other end 27 is free. A control lever 28, pivoted to the fixed end 25, is mounted for movement into the dot-and-dash position of Figure 1, and is adapted to pry the free end 27 into the dot-and-dash position, thereby slightly enlarging the interior diameter of this ring. When the handle 28 is released, it snaps back into the full line position of Figure 1, and the ring returns to its normal size, due to its inherent resilience. The ring thus serves as a convenient circular clamp adapted frictionally to engage the telescope eye-piece 10, as shown in Figures 2 and 6. When thus engaged, it will be observed that the optical axis of the telescope eye-piece is in direct alignment with the optical axis of the camera lens 24, the latter being thus receptively positioned with respect to the light emanating from the telescope.

The housing 12 is substantially cylindrical, and frictionally mounted or otherwise secured in its interior is an insulating block 30 suitably contoured so that it does not intercept the camera objective. The block 30 is provided with a pair of arcuate grooves in which fixed metallic contact members 31 and 32 are mounted. By means of a binding screw 33, the member 31 is electrically connected with one lead wire 34, while a similar screw 35 allows the other contact member 32 to be connected to another lead wire 36. The lead wires 34 and 36 are preferably embodied in a single flexible cord 37 which extends radially through the housing 12 and terminates in a connector element 38, shown most clearly in Figure 1. This connector element has not been shown in detail, because it is well known per se, and because any convenient connector element may be employed. The purpose of the element 38 is to establish an electrical connection with the connector or binding post provided on the endoscopic instrument. This is diagrammatically indicated in Figures 3 and 4 in which the reference numeral 39 is applied to a symbolic representation of the electric lamp which illuminates the field of view of the telescope. It will be observed that one terminal of the lamp is thus brought into electrical connection with the contact member 31, while the other terminal is brought into electrical connection with the contact member 32.

It will be understood that the device 38 is of the character which allows it to be separately attached to a binding post or other connector of complementary construction.

Also mounted in the housing 12, and projecting radially, is an electric connector or binding post which may be of any usual construction and which I have illustratively shown as consisting of an inner rod-like member 40, an outer conductive sleeve 41, and an intermediate insulating sleeve or bushing 42. I have shown the sleeve 41 in screw-threaded engagement with the housing 12, and hence in direct electrical connection with the housing. It is insulated, however, by the bushing 42, from the post 40. This post, it will be observed, projects inwardly through a suitable opening in the block 30, and bears against the contact member 31.

This binding post is intended to afford a convenient means for establishing an electrical connection with a source of current. This is diagrammatically illustrated in Figures 3 and 4 in which the reference numeral 43 is applied to a symbolic representation of a battery or other source of voltage, one terminal connecting with the member 40, the other with the member 41. In practice, a flexible cord may extend from a suitable battery, and may terminate in a connector adapted to engage, separably, with the members 40 and 41, in a manner which is well known per se. Such a connector may, for example, be the same type as connector 38.

Also mounted in the housing 12, in a radial disposition, is a screw-threaded plug-like member which consists of an outer conductive portion 44, and an inner insulating portion 45. The latter projects into the interior of the housing 12, and carries a resistance wire 46. One end of this resistance is attached to the conductive portion 44, while the other end connects with a contact 47 which presses against the free end of the contact member 32. In this way, one end of the resistance is electrically connected with the housing 12, and through the connector 41 with one terminal of the battery 43. The other end of the resistance is connected, through the member 32 and the wire 36, with one terminal of the lamp 39. It will be observed that this establishes a complete lamp circuit, with the resistance 46 in series.

Also mounted in the housing 12, in a radial disposition, is a tubular fitting 50 with an externally threaded portion 51. This fitting is adapted to receive the inner end of a telescope extension. This extension comprises the portion 52 which projects through the fitting 50 and through a bore 53 in the block 30, and a portion 54 (Figure 2) which terminates in an eye-piece 55. It will be observed that the portion 54 is substantially parallel to the camera axis, while the portion 52 projects laterally from the housing 12. This is illustrative of a convenient and preferred construction, but it will be understood that the eye-piece 55 might, if desired, be mounted directly on the lateral portion 52 of the telescope extension. It will also be understood that there are suitable lenses and at least one reflector in this angular telescope extension, for the purpose of transmitting through it, from the illustrative inner lens 56 to the eye-piece 55, such light rays as may be introduced into the lens 56.

This telescope extension is adapted to be removably attached to the housing 12 by means of an internally threaded attachment member 57 (Figure 2) which engages with the threads 51 on the fitting 50.

Interposed optically between the telescope eye-piece 10 and the telescope extension is a reflector 58 which I have shown in the form of a reflecting prism mounted in a suitably shaped frame 59. This frame is supported on a metallic arm 60 which is pivoted as at 61 to the base of the housing 12. A spring, such as the coil spring 62, constantly urges the arm 60, and with it the reflector 58, in a clockwise direction, as viewed in Figures 3 and 4, so that under normal circumstances the reflector 58 is in the position shown in Figures 1, 3 and 6. When in this position, the light emanating from the telescope 10 is reflected at right angles into the portion 52 of the telescope extension. As a result, the surgeon who has attached the camera to the telescope eye-piece 10 may continue to observe the illuminated field of vision by applying his eye to the eye-piece 55.

The arm 60 has an angular portion 63 which projects into the path of movement of a flexible rod 64. This rod is mounted in a flexible channel 65 (Figure 1) which merges with the channel 18, so that manipulation of the shutter actuator advances not only the rod 17 but also the rod 64. The channel 65 terminates in a screw-threaded connector 66 which may be removably attached to a fitting 67 mounted in the housing 12.

Figure 4:
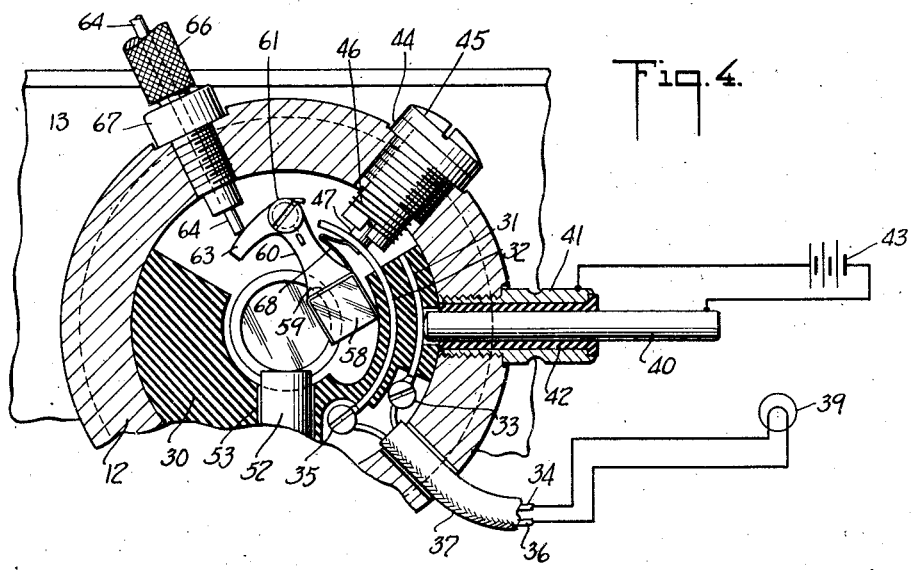
Figure 4 is a view similar to Figure 3 with the parts in an adjusted relationship.

When the shutter actuator is manipulated, the rod 64 advances to the position shown in Figure 4, and serves to pivot the reflector 58 into substantially the position shown in Figure 4, thus swinging it out of alignment with the camera axis, and allowing the light emanating from the telescope eye-piece 10 to pass directly through the camera objective.

It should be observed that the reflector-support carries a contact member 68 which is preferably of springy metal doubled upon itself as shown in Figures 3 and 4. This movable contact element is adapted to encounter and press against the fixed contact member 32 whenever the reflector is shifted into the position shown in Figure 4. This serves to short circuit the resistance 46, because the current theretofore passing from the connector 41 to the member 32 through elements 12, 44, and 46, is enabled to pass directly to the member 32 through elements 12, 59, and 68.

When the shutter actuator is released, and the reflector allowed to resume its normal position, the resistance 46 is automatically reinserted in the lamp circuit.

The manner of use of the present apparatus will be obvious from the foregoing description, but the procedure may be briefly reviewed. The camera is first attached to the eye-piece 10 by manipulation of the clamp 11. The connector 38 is hooked up to the connector on the surgical instrument itself. An electrical connection is established between the binding post 40—41 and a suitable source of electric current. These are all extremely simple manipulations which can be effected with great ease. The surgeon then applies his eye to the eye-piece 55, which affords him the same illuminated vision of an interior portion of the body as he would have under normal circumstances with his eye applied directly to the eye-piece 10. Whenever he has the surgical instrument adjusted to his satisfaction, he is enabled to take a picture of the region under examination by merely pressing upon the shutter actuator 16. This manipulation swings the reflector aside, causes the electric lamp to shed an intensified illumination, and actuates the camera shutter. On release of the shutter actuator, the lamp resumes the normal brilliance, and the reflector swings back into position to restore the surgeon's vision of the subject that has just been photographed. If the camera is of the automatic type, the release of the shutter actuator also brings about an automatic advancement of the film in the camera, so that one or more additional photographs might be immediately taken.

After the camera has served its purpose, the connector 38 is disconnected, the cord from the battery is removed from the connector 40—41 and restored to the connector on the surgical instrument itself, and the clamp 11 is released so that the camera attachment can be removed. The surgeon is then immediately ready to proceed with the normal use of the surgical instrument, should he so desire.

It will thus be observed that the present apparatus affords a simple and unusually expeditious and efficient means for photographing interior portions of the body, all without the necessity for using specially-designed surgical instruments, or even in the slightest way modifying existing instruments. Moreover, from the camera aspect, any of a number of available cameras may be utilized without the necessity for any drastic or permanent reconstruction.

In general, it will be understood that changes in the details, herein described and illustrated for the purpose of explaining the nature of my invention, may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is:

1. The combination with a surgical instrument in which there is a telescope and an electric lamp for illuminating the field of view of the telescope, of a camera, a housing carried by the camera and provided with means for removably connecting the camera to the eye-piece of the telescope so that the objective lens of the camera is receptively positioned with respect to the light emanating from the telescope, and means carried by said housing and operable by the shutter actuator of the camera for increasing the voltage of said electric lamp.

2. The combination with a surgical instrument in which there is a telescope and an electric lamp for illuminating the field of view of the telescope, of a camera, a housing carried by the camera and provided with means for removably connecting the camera to the eye-piece of the telescope so that the objective lens of the camera is receptively positioned with respect to the light emanating from the telescope, and means operable by the shutter actuator of the camera for increasing the voltage of said electric lamp; said means comprising a resistance in the lamp circuit, and means operable by the shutter actuator for short-circuiting said resistance, said resistance and short-circuiting means being carried by said housing.

3. The combination with a surgical instrument in which there is a telescope and an electric lamp for illuminating the field of view of the telescope, of a camera, a housing carried by the camera and provided with means for removably connecting the camera to the eye-piece of the telescope so that the objective lens of the camera is receptively positioned with respect to the light emanating from the telescope, and means operable by the shutter actuator of the camera for increasing the voltage of the said electric lamp; said means comprising a resistance in the lamp circuit, a pivotally-mounted contact member normally out of the lamp circuit, and means operable by the shutter actuator for pivoting said contact member into a position short-circuiting said resistance, said resistance and contact member being carried by said housing.

4. The combination with a surgical instrument in which there is a telescope, an electric lamp for illuminating the field of view of the telescope, and an electrical connector normally adatped to establish connection between the lamp and a source of voltage; of a camera, a housing carried by the camera and provided with means for removably connecting the camera to the eye-piece of the telescope so that the objective lens of the camera is receptively positioned with respect to the light emanating from the telescope, and means operable by the shutter actuator of the camera for increasing the voltage of said electric lamp; said means comprising a resistance, means connecting with one end of the resistance and adapted to engage said connector to insert said resistance in the lamp circuit, means leading from the other end of the resistance and adapted to establish connection with a source of voltage, and means operable by the shutter actuator for short-circuiting said resistance, said resistance and short-circuiting means being carried by said housing.

5. The combination with a surgical instrument in which there is a telescope and an electric lamp for illuminating the field of view of the telescope, of a camera, a housing carried by the camera and provided with means for removably connecting the camera to the eye-piece of the telescope so that the objective lens of the camera is receptively positioned with respect to the light emanating from the telescope, a telescope extension, a movable reflector in said housing and normally interposed optically between the telescope and the telescope extension, and means carried by said housing and operable by the shutter actuator of the camera for moving the reflector aside and also increasing the voltage of said electric lamp.

6. The combination with a surgical instrument in which there is a telescope and an electric lamp for illuminating the field of view of the telescope, of a camera connected to said instrument with the objective lens of the camera receptively positioned with respect to the light emanating from the telescope, a telescope extension, a movable reflector normally interposed optically between the telescope and the telescope extension, and means operable by the shutter actuator of the camera for moving the reflector aside and also increasing the voltage of said electric lamp; said means comprising a resistance in the lamp circuit, and a contact member carried by the reflector and movable with the latter into a position short-circuiting said resistance.

7. The combination with a surgical instrument in which there is a telescope and an electric lamp for illuminating the field of view of the telescope, of a camera, a housing provided with means for removably connecting the camera to the eye-piece of the telescope so that the objective lens of the camera is receptively positioned with respect to the light emanating from the telescope, a lateral telescope extension carried by said housing, a movable reflector mounted in the housing in a position which is normally interposed optically between the telescope and the telescope extension, and means carried by said housing and operable by the shutter actuator of the camera for moving the reflector aside and also increasing the voltage of said electric lamp.

8. The combination with a surgical instrument in which there is a telescope and an electric lamp for illuminating the field of view of the telescope, of a camera, a housing provided with means for removably connecting the camera to the eye-piece of the telescope so that the objective lens of the camera is receptivaly positioned with respect to the light emanating from the telescope, a lateral telescope extension carried by said housing, a movable reflector mounted in the housing in a position which is normally interposed optically between the telescope and the telescope extension, and means operable by the shutter actuator of the camera for moving the reflector aside and also increasing the voltage of said electric lamp; said last-named means comprising a resistance mounted in said housing, means establishing an electrical connection of said resistance in series with the lamp circuit, and a contact member carried by the reflector and movable with the latter into a position short-circuiting said resistance.

FREDERICK C. WAPPLER.